United States Patent [19]

Müller

[11] 3,843,842

[45] Oct. 22, 1974

[54] REMOTE REWIND CONTROL SYSTEM

[76] Inventor: Willy Müller, Guggerstrabe 13, 8702 Zollikon/Zurich, Germany

[22] Filed: July 10, 1972

[21] Appl. No.: 270,326

[30] Foreign Application Priority Data

July 13, 1971 Germany .......................... 2134927

[52] U.S. Cl. .................................................. 179/6 E
[51] Int. Cl. .......................................... H04m 11/10
[58] Field of Search ..................................... 179/6 E

[56] References Cited

UNITED STATES PATENTS

| | | | |
|---|---|---|---|
| 2,537,406 | 1/1951 | Handschin | 179/100.1 VC |
| 3,136,856 | 6/1964 | Zimmermann | 179/6 E |

*Primary Examiner*—Bernard Konick
*Assistant Examiner*—Alan Faber
*Attorney, Agent, or Firm*—J. Gibson Semmes

[57] ABSTRACT

The specification describes a method for remote reverse control in the remote interrogation of information recorded in memory means via a transmission channel, more particularly in the remote reproduction of voice recordings in an automatic telephone answering device via a telephone line. The information transmission and the control of the playback and possibly the reverse operation occur via the same transmission channel. The playback operation is stopped at certain intervals for a preset short time and these points in time a check signal, preferably a check signal lying in the audio range, is transmitted to the interrogating station and simultaneously a detector device which responds to a reverse command signal which may be brought about by this, of the interrogating station, more particularly a previously agreed to speech sound of the interrogator, the detector circuit being more particularly a speech switch responding to the speech sound agreed to as a reverse command signal, is activated for the predetermined short stopping time, which on transmission of a reverse command signal produces an operating signal for reverse drive, while if no such reverse command signal is received the playback operation is continued after the short stop.

10 Claims, 2 Drawing Figures

REMOTE REWIND CONTROL SYSTEM

BACKGROUND OF INVENTION

1. Field to which invention relates

The invention relates to a method and a circuit for remote reverse or rewind control and more particularly to such a method and a circuit connected with the remote interrogation of information recorded in storage means via a transmission channel, such as, for instance, the interrogation via a telephone line of an automatic telephone answering device in order to recover from it speech which it has recorded, the transmission of the information and the control of the playback and possibly return movement occurring over the same transmission line.

2. The prior art

In the case of various information storage systems with remote interrogation there is a requirement for the possibility of bringing about, from the interrogation station, a short reverse movement in the course of the playback of the stored information. Thus, for example, automatic telephone answering devices with a facility for recording conversations have been proposed in which the recorded conversations can be caused to be played back by an authorized person from outside via the telephone line, security as regards the control of the telephone answering device being ensured as regards remote playback by means of a code, for example a speech controlled code.

Devices of this type have already been proposed which are to make possible a reverse control on remote interrogation by the use of a certain revers command signal transmitted from the interrogation station. On the one hand, the use as a reverse control signal of an audio signal with a high frequency has been proposed. This has the disadvantage that for the production of this audio signal it is usually necessary to provide a special signal generator which the authorized interrogator must carry around with him. Furthermore, the use of high frequencies for the reverse command signal involves the disadvantage that these high frequencies may not be transmitted by long telephone lines or may not be transmitted reliably if the frequency should be chosen with an excessively high value.

In accordance with a further prior proposal a sound signal lying within the audio range was to be used as a reverse command signal. Such a sound signal could more particularly be a certain vowel of the human voice. Circuits previously proposed of this type have the disadvantage that the detector device, provided in the telephone answering device to respond to this reverse command signal, and which may be a speech switch in any case provided in the device and which responds to the above-mentioned selected vowels, for example the vowel "A" of the human voice, "hears itself" to a certain degree, that is to say it cannot distinguish whether a vowel is contained in the information which is played back remotely to the interrogating station of whether this vowel has been spoken by the authorized interrogator as a rewind command signal. Thus, in certain conditions the case may arise that the device excites itself and owing to the automatic program control hunts backwards and forwards between the playback and reverse conditions and cannot switch itself off or carry out a further switching operation.

SUMMARY OF INVENTION

One aim of the present invention is to provide a method and a circuit for remote reverse control of the above-mentioned type which, on the one hand, operates with the principle, particularly convenient for the user, of speed control, which makes unnecessary the use of a separate signal source for the production of the reverse command signal and in which, on the other hand, the above-mentioned disturbances in function of previously proposed devices of this type, which are finally due to the fact that the reverse command signal and the information transmitted during playback, because they lie in the same frequency range cannot be separated from each other, can be reliably avoided.

For this purpose there is the provision in accordance with the reverse remote control method in accordance with the invention that the playback operation is stopped at certain intervals for a preset short time and that these points in time a check signal, preferably a check signal lying in the audio range, is transmitted to the interrogating station, and that simultaneously a detector device which responds to a reverse command signal from the interrogating station, more particularly a previously agreed to speech sound of the interrogator, which may be brought about by the transmission of the check signal to the interrogating station, the detector circuit being more particularly a speech switch responding to the speech sound agreed to as a reverse command signal, is gated sensitive for the predetermined short stopping time, which on transmission of a reverse command signal produces an operating signal for reverse drive, while if no such reverse command signal is received the playback operation is continued after the short stop.

A circuit operating in accordance with this principle for remote reverse control is characterised in accordance with the invention by a pulse generator, which during the playback operation produces actuating pulses at preset intervals with a preset short duration; by a bistable circuit with a preparation input connected with the output of the pulse generator, with a set input connected with the detector circuit, more particularly the speech switch, for switching over into the other stable condition, and with a reset input connected with a delay circuit; by a check signal generator, more particularly an audio frequency oscillator which can be triggered by the actuating signal of the pulse generator for the production of a check sound lying in the audio range for transmission to the interrogating station as an invitation for the transmission of a reversing command if a reverse movement should be desired; by a detector device, more particularly a speech switch, which can be gated from a substantially insensitive condition to assume a responsive sensitized condition, the detective device in the sensitized condition thereof being responsive to a reverse command signal transmitted from the interrogation station, more particularly in the form of a preset speech vowel, and in accordance with this produces an output signal passed to the setting input of the bistable circuit for switching it over into the second stable condition; by a blocking circuit responsive to the actuating pulse of the pulse generator and which ensures, via a conditioning input of the speech switch, that the speech switch, which is insensitive during normal playback operation, is only keyed up or gated sensitive during the duration of the actuating pulse produced by the pulse generator into the sensitive condition for the reverse command signal; by a control unit connected with the output of the bistable circuit, which on transition of the bistable circuit into its second stable condition produces a control signal for the operation of the reverse drive; and by a delay circuit connected with the pulse generator which in accordance with the actuating pulse of the pulse generator prepares the resetting input of the bistable circuit with an adjustable time delay after a preceding switching over into the second stable condition so that the bistable circuit is reset into the first one of its stable conditions by the next pulse, following the resetting preparation, of the pulse generator so that the reverse operation is terminated and the playback operation is repeated.

In accordance with the invention the playback operation is thus stopped in preset intervals at short periods of time; during this short stopping time a check signal is produced and passed via the transmission channel, for example the telephone line, to the interrogation station, the signal preferably being a check sound signal lying in the audio range; at the same time, during this short stopping period, the speech switch, which is otherwise insensitive during the playback operation, is activated so that it responds to a possible reverse command signal, in the form of a certain previously set speech sound, for example the "A" vowel, spoken by the interrogator via the telephone line, in a reliable manner and in dependence on the signal given can initiate the reverse winding operation. Since during the stopping period, during which the speech switch in sensitive, playback is not being carried out, the possibility of a spurious operation of the rewind control by the vowels of the type mentioned contained in the stored information is effectively excluded.

The reverse control in accordance with the invention is excellently suited for use in conjunction with automatic telephone answering devices with a speech recording facility and (speech code secured) remote interrogation; a telephone answering device of this type, for which the remote reverse or reverse winding control in accordance with the invention is particularly suitable is described in U.S. Pat. application Ser. No. 830,049 of July 3, 1969, since issued as U.S. Pat. No. 3,673,332 in detail. The range of application of the remote reverse control in accordance with the invention is, however, not limited to this and indeed it is generally applicable in all those cases in which remote interrogation of stored information is to be provided for via a transmission line with the possibility of a rewind or repeating operation and the transmission of information and the transmission of the control signal for playback and possibly rewinding or reverse is to be carried out along one and the same channel and the control signals have characteristics similar to the transmitted information, and more particularly lie in the same frequency range as the latter.

LIST OF SEVERAL VIEWS OF DRAWINGS

In what follows the invention will be described in detail in accordance with the principle and with reference to a preferred embodiment, as shown in the drawings. FIG. 1 shows the principle of the reverse or rewind remote control in accordance with the invention in the form of a block circuit diagram. FIG. 2 is a detailed circuit diagram of the return or rewind remote control circuit in accordance with the invention.

DESCRIPTION OF PREFERRED EMBODIMENTS

Figure 1:
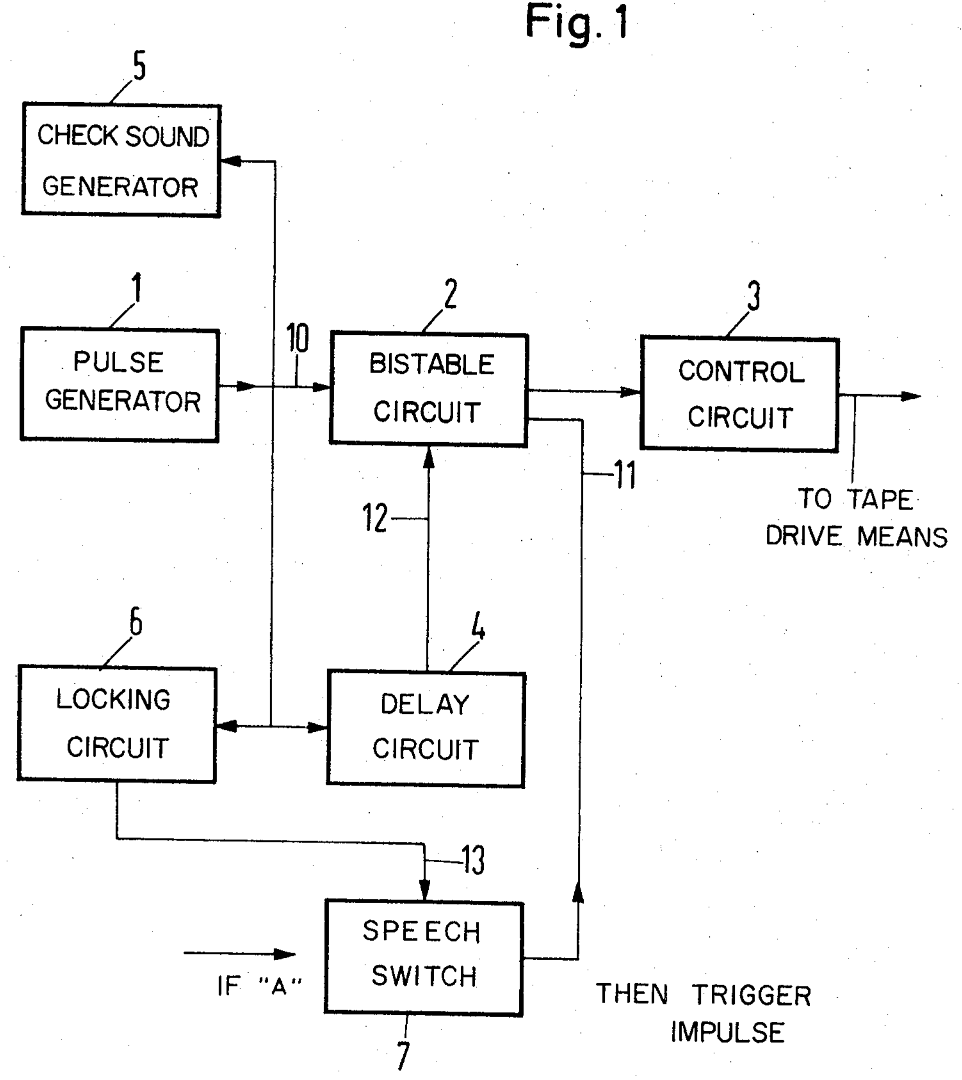

In accordance with the diagrammatic block circuit shown in FIG. 1 the return or rewind control system in accordance with the invention comprises a pulse generator 1, which during the playback operation in a preset sequence supplies current pulses kith a preset (short) duration which are passed to the preparation input 10 of a bistable circuit 2, by means of which the circuit is prepared for switching over into its second stable condition. Simultaneously the actuating pulse of the pulse generator 1 triggers a check sound generator 5, which in accordance with this produces a check sound signal serving as a marking or invitation signal and transmits it to the interrogation station. Simultaneously the actuating pulse of the pulse generator 1 triggers a locking circuit 6, which via a conditioning input 13 activates a detector, more particularly a speech switch 7, responding to any reverse or rewind command signals of the interrogation station, out of its normal insensitive condition maintained during the playback operation, into a sensitive condition during the duration of the actuating pulse. If a signal, for example the "A" vowel, previously set as a reverse command comes from the interrogation station during the activated period, determined by the duration of the actuating pulse, of the speech switch 7, the latter, in accordance with this, produces an output signal, which is supplied to the setting input 11 of the bistable circuit 2, which by this is switched over into its second stable condition. This transition of the bistable circuit 2 into its second stable condition is responded to by a control unit 3 with the initiation of the rewinding or reverse function. The original actuation pulse of the pulse generator 1 furthermore simultaneously starts a delay circuit 4, which with a preset adjustable delay prepares the resetting input 12 of the bistable circuit 2; after this resetting preparation the actual resetting of the bistable circuit into its first stable condition occurs by the following pulse of the pulse generator 1. The design of the circuit, more particularly of the delay circuit 4 can be constructed in this respect for the production of reverse movement of any desired size. In particular it may be ensured that by several rewinding or reverse actuations the recording medium can be moved back to its start.

In what follows a preferred embodiment of a reverse circuit in accordance with the invention will be described with reference to the detailed circuit diagram of FIG. 2 as regards construction and manner of operation. This embodiment is concerned particularly with a remote rewind control for a telephone answering device having a facility for recording speech and for speech code controlled remote interrogation. As a recording device in such a telephone answering device it is possible to provode for example a tape unit, whose drive can be switched over in a conventional manner between slow and rapid forward movement and to (rapid) rewind. The slow forward winding can be controlled by an actuating magnet for the pressing roller for the tape recorder and accordingly the rapid rewind can be controlled by a rewind actuating magnet. Furthermore, such a telephone answering device with a facility for recording conversations and reproduction can already contain a speech switch which for example via a filter circuit responds to selected frequencies (for example to the "A" vowel of the human voice) in the case of code secured remote control of the device and controls the playback of the recorded conversations for transmission to the authorized person calling the device from outside; furthermore, the speech switch can serve for automatic switching off on speech recording of an incoming call, when the caller brings about a certain pause, which can be set on the device, (for example 6 to 8 seconds). This speech switch already provided in the telephone answering device can be directly used as a speech check switch for the purpose of the reverse remote control in accordance with the invention. In the circuit diagram of FIG. 2 the parts belonging to the telephone answering device, such as the tape recording mechanism with the control drive magnet, speech switch etc., which as such do not form parts of the return control in accordance with the invention in a restricted sense are not specially shown; the connection with the relevant functional parts of the telephone answering device is shown by the terminals A to K, whose meaning will be explained in detail below.

A telephone answering device with conversation recording facility and (code controlled) remote reproduction of the generally described type, for which the return remote control in accordance with the invention is particularly suitable is described in detail in U.S. Pat. application Ser. No. 830,049 of July 3, 1969, since issued as U.S. Pat. No. 3,673,332.

Figure 2:
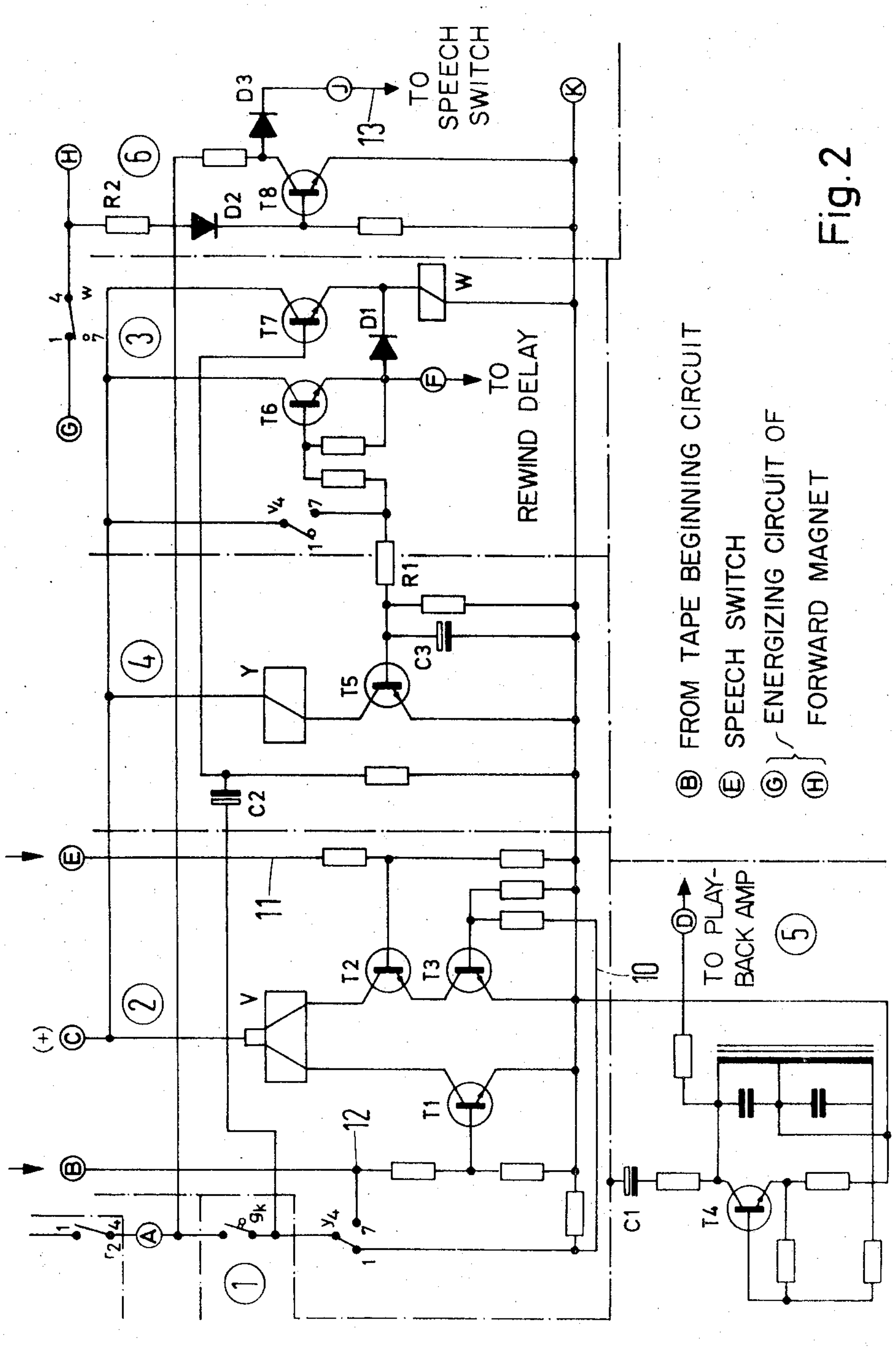

The parts or component groups corresponding to the circuit blocks of the block diagram of FIG. 1 are indicated by broken lines in the detailed circuit of FIG. 2. As a pulse generator 1 use is made in the embodiment of FIG. 2 for example of a motor-driven mechanical contact $g_k$, which is connected via a connection terminal A with the answering device and is energised from it by a positive voltage via a relay contact *r*2–4,1 of a so-called "correct" relay; the "correct" relay of the telephone answering device is only closed when a code-correct remote control for remote playback of the recorded calls has come into being. The voltage actuation of the pulse generator contact $g_k$ thus only occurs during the remote reproduction in accordance with code remote control of the telephone answering device for reproducing the recorded telephone conversations. The pulse generator contact $g_k$ is closed by a suitable drive which can be set in preset intervals in time, for example every 25 to 30 seconds for a preset short period of time, for example 2 seconds.

In the embodiment shown the bistable circuit 2 has a polarized relay V with two input or reciting windings; in the exciting circuit of the one winding, serving for resetting the relay V into the one of its two stable switching positions, there is placed the emitter-collector path of a resetting control transistor T 1; in the feed circuit of the other winding, serving for switching over the relay V into its other stable condition, there are connected in series the emitter-collector paths of a preparation control switching transistor T 3 and a switching over control transistor T 2. The base of the preparation control transistor T 3 is connected via a relay contact $y_4$ in its switching position $y_{4-1}$ with the pulse generator output; in the other position of the relay contact $y_{4-7}$ the base of the resetting transistor T 1 is connected with the pulse generator 1; moreover the base voltage divider of the resetting transistor T 1 is connected with the output of a tape beginning circuit provided in the telephone answering device, which supplies a positive output signal when during (rapid) return movement of the recording mechanism the beginning of the tape (or the start of any other recording medium) is reached. The base of the switching over transistor T 2 is connected via a terminal E with the output of the speech switch in the telephone answering device, and the switch in the sensitive condition supplies a positive switching signal when via the telephone line a speed sound with certain characteristic frequencies, for example the "A" vowel, is spoken by the interrogating user of the device. The other ends of the two exciting windings of the polarized relay V are connected via a terminal C with a positive supply voltage. The emitters of the transistors T 1 and T 3 are connected with a common earth or ground lead K.

The delay circuit 4 has a working relay Y whose winding is controlled by a transistor driver stage T 5; the base, serving as the control electrode, of the switching transistor T 5 of the relay driver stage can be driven via a delay member R 1, C 3, that is to say via a normally opened contact $v_{4-7}$ of the polarized relay V of the bistable circuit 2. The relay contact $v_{4-7}$ closed on switching over the relay V into its other stable condition and then connects the basis of the transistor T 5 via the RC member with the positive voltage source C; the working winding of the relay Y has its other end also connected with the positive voltage source C.

The control unit 3 has an operating or working relay W and a control switching transistor T 7 in its exciting circuit; the base electrode of the control switching transistor T 7 is connected via a coupling capacitor C 2 with the output of the pulse generator 1. A normally closed contact $w_{4-1}$ of the relay W lies between the terminals G and H in series in the exciting current circuit of the magnet bringing about engagement with the capsten for slow forward movement (playback), of the telephone answering device. When the relay W of the control unit 3 responds the opening contact $w_{4-1}$ thus interrupts the forward movement and thus the playback operation. The control unit 3 furthermore has a control switching transistor T 6, which is the conducting condition via its emitter-collector path and the output terminal F connected with the reverse relay of the telephone answering device switches on the rapid rewind or reverse movement of the recording mechanism; the switching on of the normally blocked transistor T 6 into its conducting condition occurs owing to the action of current on its base via the above-mentioned contact $v_{4-7}$ of the polarized relay V of the bistable circuit on its switching over into its other stable condition. Furthermore, the transistor T 6 serves, via a diode D 1, simultaneously as a holding current circuit for the relay W after the end of the opening pulse supplied via the coupling capacitor C 2 to the transistor T 7.

The check sound circuit 5 has an audio frequency transistor oscillator circuit T 4 which on its input side is connected via a coupling capacitor C 1 and the rest condition of the relay contact $y_{4-1}$ is connected with the output of the pulse generator 1 and on the output side is connected via the terminal D with the playback amplifier of the telephone answering device in such a manner that on the excitation, triggered by the initiation pulse of the pulse generator 1, of the oscillator T 4 a check sound is transmitted to the telephone line so that the interrogating person will understand that this constitutes an invitation to produce the sound agreed to, for example the "A" vowel, for bringing about rewind, if desired.

The blocking circuit 6 has a control switching transistor stage T 8, whose base electrode is connected via a series circuit comprising a resistor R 2 and a diode D 2 with the terminal H and from the latter it receives a positive control voltage when the relay contact $w_4$ opens. The collector output of the transistor T 8 is connected via a diode D 3 with a terminal J, which in turn is connected with a muting circuit controlling the sensitivity of the speech switch.

In what follows the manner of operation of the embodiment described of a reverse remote control in accordance with the invention will be explained.

Let it be assumed that a code remote control of the telephone answering device is being performed (the relay $r_{2-1}$ is therefore closed) and the recording mechanism of the answering device after return to the start is now transmitting in the playback setting the recorded telephone calls via the telephone line to the authorized person who has remotely interrogated the device. In the course of this playback operation the contact $g_k$ of the pulse generator 1 is closed at preset intervals in time and on closing the contact $g_k$ via the relay contact $y_{4-1}$ and the preparation input 10 of the bistable circuit 2 a positive voltage is applied to the base of the preparation transistor T 3 and this is then switched over into the conducting state and thus the switching over of the polarized relay V into its other stable circuit condition is prepared for.

Simultaneously via the coupling capacitor C 2 the base of the transistor T 7 of the control unit 3 is driven through and the latter is switched over into the conducting condition. The transistor T 7 thus causes the relay W to respond; the contact $w_{4-1}$ opened by this operation of this relay (between the connection terminals G and H) interrupts the current supply circuit of the forward magnet of the recording mechanism, so that the latter becomes inoperative and the forward drive is interrupted for a short time.

Simultaneously via the coupling capacitor C 1 the oscillator stage T 4 of the check sound circuit is excited and accordingly produces an audio frequency sound signal at the output D and this signal is transmitted via the playback amplifier of the telephone answering device to the telephone line and detected by the interrogator and, as agreed, is understood to be a request to bring about rewinding or reversal, if desired, by pronouncing the "A" vowl for an instant.

Simultaneously on opening the relay contact $w_{4-1}$ the positive potential occurring at the terminal H is passed via the series circuit R 2 and D 2 to the base of the control transistor T 8 of the blocking circuit 6, so that this transistor is brought into the conducting condition; the drop resulting from this in the collector potential of the transistor T 8 is supplied via the diode D 3 and the connection terminal J of the sensitivity control of the speech switch (not shown) of the telephone answering device and causes the latter to be activated. If the interrogator does not wish to start a rewinding operation, and therefore no rewind control signal is received, on opening of contact $g_k$ of the pulse generator 1 after a predetermined short interval, the forementioned occurrences will take place in the reverse direction with relay W becoming de-energized and its contact $w_{4-1}$ closing again whereby the supply circuit G–H of the forward magnet of the recording mechanism is re-energized and play-back operation resumed.

If now the interrogator whishes to start a rewinding operation (perhaps to listen again to a passage, which has not been understood or has only been poorly understood, in the recorded call last played over) he speaks the agreed control signal, for example the "A" vowel, into his telephone; accordingly the speech switch activated so as to be sensitive of the telephone answering device is excited and produced an output signal, which is supplied via the connection terminal E of the bistable switching stage 2 to the reverse circuit. Accordingly the switching over transistor T 2 is bottomed and the energizing circuit of the switching over winding of the polarized device V is closed; the relay V therefore swings over into its other stable condition and as a result the contact $v_{4-7}$ of the relay V is closed in the control circuit 3. As a result a positive signal is supplied to the base of the transistor T 6 and this transistor is brought into the conducting condition. Via the connection terminal F, which is connected with the reverse relay of the telephone answering device, rapid rewind is brought about. Simultaneously for the relay W via the diode D 1 a holding circuit is closed. On the other hand, owing to the closing of the relay contact $v_{4-7}$ the delay circuit 4 via the delay member R 1, C 3 and the switching transistor T 5 the relay Y is energized with a delay. On delayed response of the relay Y its contact $y_{4-7}$ is closed; accordingly with the next following pulse of the pulse generator 1 (contact $g_k$) the resetting transistor T 1 becomes conducting and moves the relay V back into its first stable condition. Thus, the reverse or rewind cycle is concluded. The relay contact $v_4$ switches from the position 4–7 into the position 4–1 so that the transistor T 6 no longer conducts. The energization of the rewind or reverse relay is interrupted and the excitation of the relay W is blocked; the contact $w_{4-1}$ closing again, brings about forward movement and playback operation begins again.

The delay circuit 4 can in this respect be designed in any desired manner so that the response of the relay Y and thus the switching over, bringing about resetting, of the relay contact $y_4$ out of the position 4–1 into the position 4–7 occurs before the next following or even before the next but one, third but one etc. pulse of the pulse generator 1 after the actuating pulse. In the embodiment shown the circuit is so dimensioned that one pulse is bridged over and on the second pulse switching back occurs. This ensures that in the case of long recordings repeated sequential rewinding of the tape can be used to reach the beginning of the tape.

In the case of the embodiment shown there is furthermore the provision that on reaching the beginning of the tape within one rewinding movement the bistable circuit 2 is in any case reset reliably and playback starts; for this purpose the circuit is connected via the terminal B with the tape beginning circuit of the telephone answering device, which on reaching the start of the tape supplies a positive output signal to the base of the resetting transistor T 1 and thus ensures the resetting operation in a reliable manner.

The above-described example of the invention can naturally be modified as regards features of circuitry in many different ways. Thus, for example as a pulse generator instead of a motor-driven mechanical contact use can be made of a self-excited multivibrator, for example with UIC-transistors, multi-layer diodes or in the form of coupled gate circuits, self-excited flip-flops or OP-amplifiers, possible with integrated circuits. The bistable circuit 2 can in the manner indicated comprise transistors in conjunction with the polarized relay or can purely electronically only be provided with transistors possibly in integrated circuits; the construction with polarized relays has the advantage that the instantaneous condition is maintained reliably even if the current is cut off and after the return of the current no disturbances in function occur. The circuit parts 3, 4 and 6 can be constructed both with discrete components and also with integrated circuits, for example with gate circuits.

Furthermore, the return remote control in accordance with the invention is not limited to the preferred use in connection with automatic telephone answering devices with speech recording facilities and remote interrogation. Indeed it is suitable in all those cases in which in the case of the remote interrogation to recover stored information via a transmission channel a return or repeating possibility is to be provided for and the information transmission and the transmission of the control signals for the reproduction and possibly the resetting operation is to occur via one and the same line and the control signals have similar characteristics to the transmitted information, more particularly lie in the same frequency range as the latter.

The embodiments of the invention in which an exclusive property or privilege is claimed are as follows:

1. In a method for remote rewind control from an interrogating station in the remote interrogation of information recorded in memory means via a transmission channel, more particularly in the remote reproduction of voice recordings in an automatic telephone answering device via a telephone line, the information transmission and the control of the playback and the rewind operation occurring via the same transmission channel the improvement that the playback operation is stopped at regular intervals for a preset time which is short in relation to said intervals between successive stoppages and that at these points in time a check signal, preferably a check signal lying in the audio range, is transmitted to interrogating station, as an invitation for the transmission of a rewinding command if a rewind movement is desired, and that a detector device which responds to a rewind command signal from the interrogating station, more particularly a previously agreed to speech sound of the interrogator, which may be received from the interrogating station following the transmission of the check signal to the interrogating station, the detector circuit being more particularly a speech switch responding to the speech sound agreed to as a rewind command signal, is being gated sensitive simultaneously with and during the preset stoppage on transmission of a rewind command signal produces an operating signal for rewind drive, while if no such rewind command signal is received the playback operation is continued after the short stop.

2. A circuit for the operation of information storage means adapted to be interrogated from an interrogating station via a communication channel, according to the method of claim 1, comprising a pulse generator, which during a playback operation produces actuating pulses at preset regular intervals with a preset duration which is short in relation to said intervals between successive stoppages; a bistable circuit having a first and second stable condition with a preparation input connected with the output of the pulse generator, with a set input connected with a detector circuit, more particularly a speech switch, for switching over into the said second stable condition, and with a reset input connected with a delay circuit; a check signal generator, more particularly an audio frequency oscillator which can be triggered by the actuating signal of the pulse generator for the production of a check sound lying in the audio range for transmission to the interrogating station as an invitation for the transmission of a rewinding command if a rewind movement is desired; a detector device, more particularly a speech switch, which can be gated from a substantially insensitive condition to assume a responsive sensitized condition, the detective device in the sensitized condition thereof being responsive to a rewind command signal transmitted from the interrogation station, more particularly in the form of a preset speech vowel, and being adapted to produce in dependance thereon, an output signal passed to the setting input of the bistable circuit for switching it over into the second stable condition; a blocking circuit responsive to the actuating pulse of the pulse generator and adapted to ensure, via a conditioning input of the speech switch, that the speech switch, which is insensitive during normal playback operation, is gated sensitive only during the duration of the actuating pulse produced by the pulse generator for the rewind command signal; a control unit connected with the output of the bistable circuit, which on transition of the bistable circuit into its second stable condition produces a control signal for the operation of the rewind drive; and a delay circuit connected with the pulse generator and adapted in dependence on the actuating pulse of the pulse generator to introduce the resetting input of the bistable circuit an adjustable time delay after a preceding switching over into the second stable condition whereby the bistable circuit is reset into the first one of the stable conditions by the next pulse, following the resetting preparation, of the pulse generator so that the rewind operation is terminated and the playback operation is repeated.

3. A circuit in accordance with claim 2, in which the pulse generator comprises a motor-driven contact which during the playback operation closes at preset intervals during a pre-established short period of time and thus produces a positive output signal.

4. A circuit in accordance with claim 2, in which the bistable circuit comprises a polarized relay with two exciting windings with the conductivity paths of control transistors being arranged in the feed current circuits of the exciting windings, and with the conductivity paths of two such control transistors being arranged in series of the feeding current circuit of the one exciting winding bringing about switching over into the second stable condition, one of the two control transistors being connected with the preparation input and the other being connected with the set input.

5. A circuit in accordance with claim 2, in which the control unit comprises a working relay with a control switching transistor, which can be triggered by the actuating pulse of the pulse generator, in the exciting current circuit of the relay, and on excitation of the relay an opening relay contact interrupts the forward operation of the information storage means and thus stops the playback operation.

6. A circuit in accordance with claim 5, in which the control unit has a transistor stage which can be controlled by a contact of the polarised relay, the transistor stage being adapted to produce an actuating signal for rapid rewind of the information storage means on the transistion of the bistable circuit into its second stable condition, and the transistor stage being further adapted to close a holding current circuit for the working relay.

7. A circuit in accordance with claim 5, in which the blocking circuit comprises a transistor stage which in accordance with the opening of the relay contact interrupting the playback operation provides an output signal to the conditioning input of the speech switch in order to place the latter in its sensitized condition for an incoming reverse command signal, more particularly a speech vowel.

8. A circuit in accordance with claim 2, in which the check signal generator comprises a transistor oscillator stage which can be triggered by the actuating pulse of the pulse generator for the production of a check signal, preferably an audio frequency sound signal lying in the audible range.

9. A circuit in accordance with claim 2, in which the delay circuit comprises a working relay with a control switching transistor stage which on transition of the bistable circuit into its second stable condition is excited via a time delay member and on response of the working relay of the delay circuit a switching-over contact of the relay connects the resetting input with the output of the pulse generator in a preparatory manner so that the bistable circuit is reset into its first stable condition on the following pulse of the pulse generator.

10. A circuit in accordance with claim 2, in which the resetting input of the bistable circuit is connected with the output of a circuit responsive to the initial setting of the information storage means, more particularly the beginning of the tape of a tape information storage means.

* * * * *